April 6, 1948.　　　　D. R. SPOTZ　　　　2,439,275
PISTON TYPE QUICK DISCONNECT COUPLING
Filed March 9, 1946　　　　2 Sheets-Sheet 2
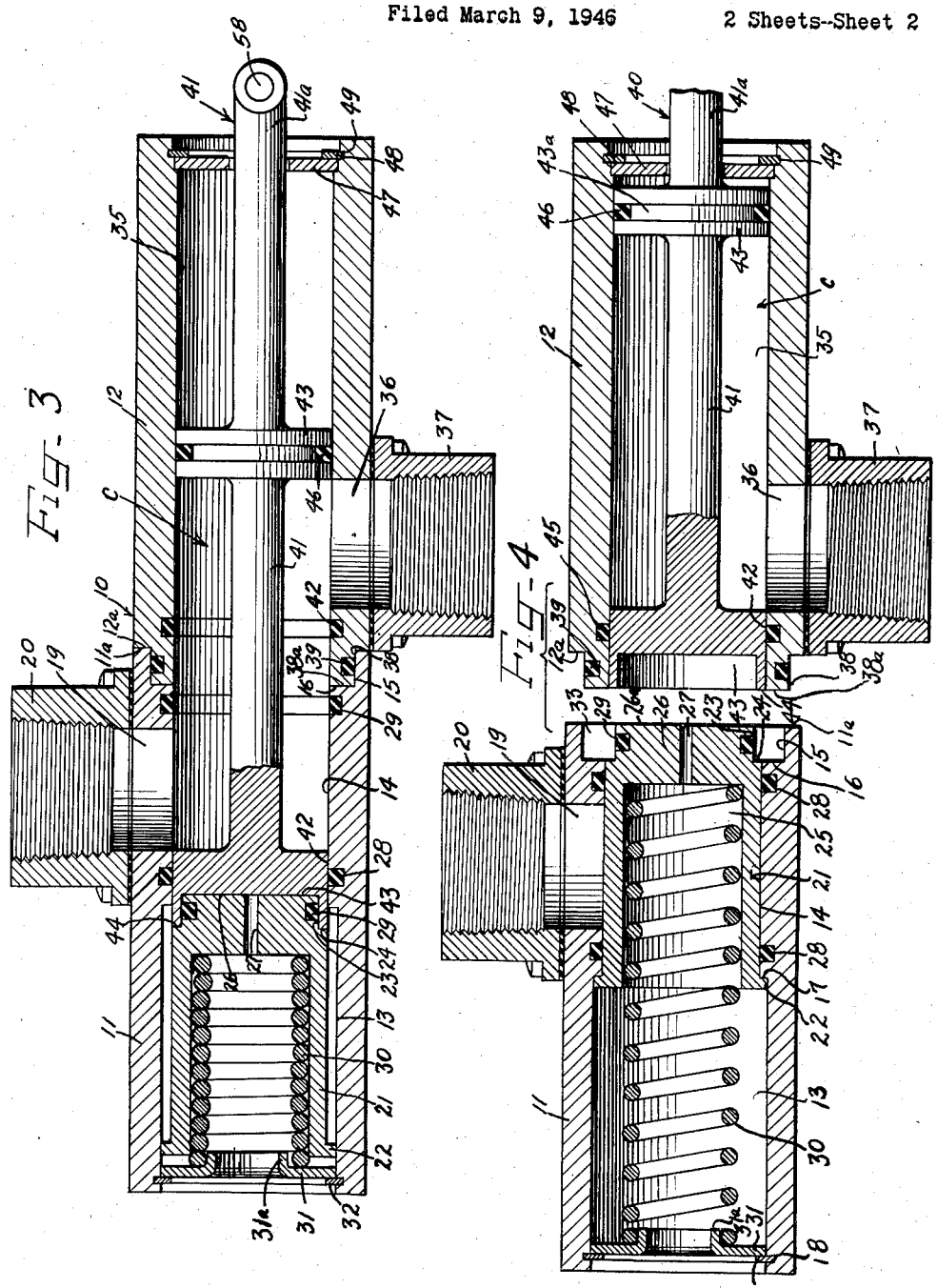
Inventor
DONALD R. SPOTZ Patented Apr. 6, 1948

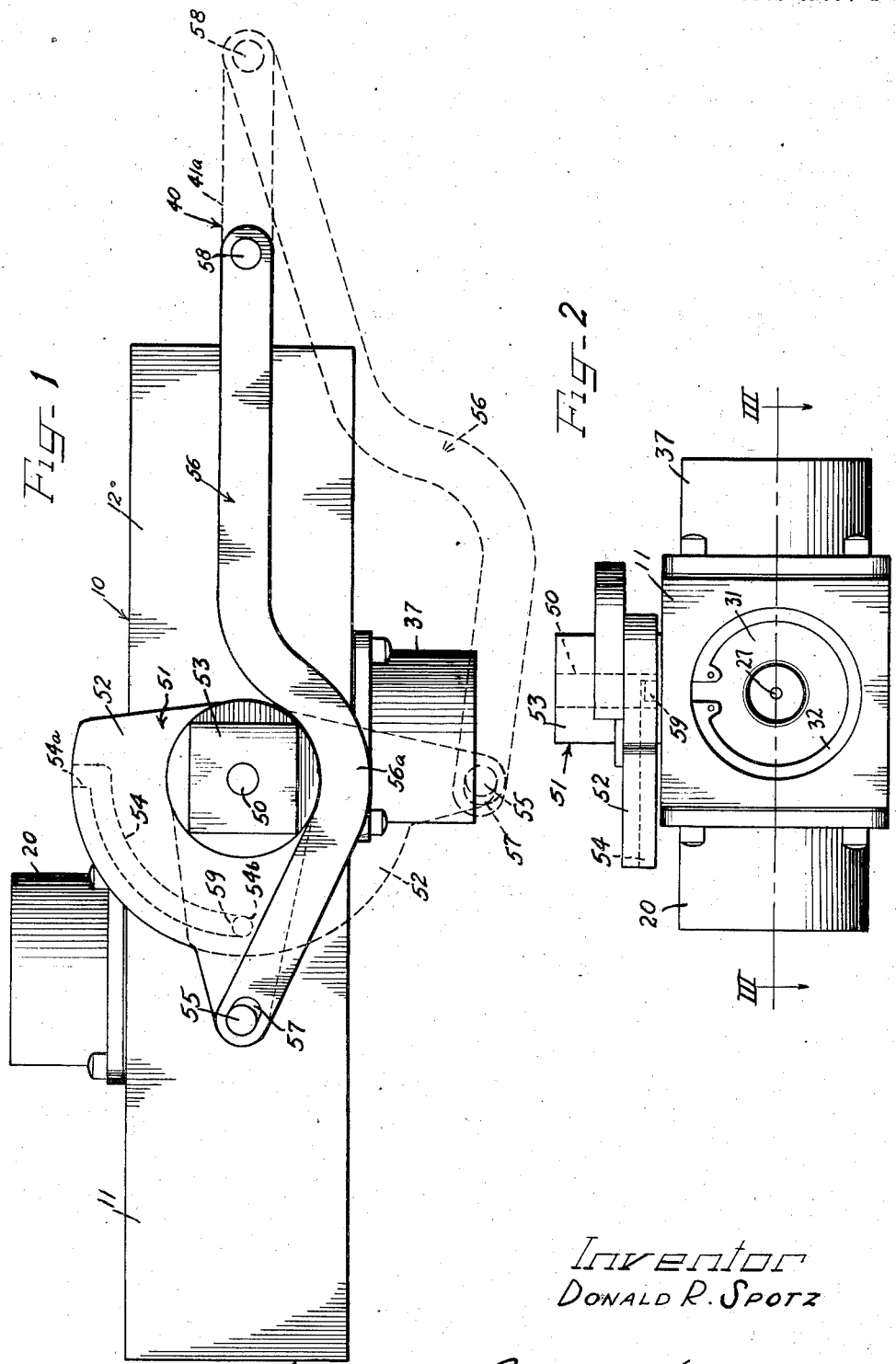

2,439,275

UNITED STATES PATENT OFFICE 2,439,275

PISTON TYPE QUICK DISCONNECT COUPLING

Donald R. Spotz, Cleveland, Ohio, assignor to Thompson Products, Inc., Cleveland, Ohio, a corporation of Ohio Application March 9, 1946, Serial No. 653,312

11 Claims. (Cl. 284—17)

This invention relates to couplings which join a plurality of conduits in fluid flow communication, and which are readily detached to separate the conduit ends in sealed relation without loss of fluid from the conduit or coupling even during the uncoupling operation.

Specifically, the invention deals with a coupling having a pair of mating casings each arranged with ports for connection with the ends of conduits and each having slidable pistons therein which seal the ports when the casings are uncoupled and which connect the ports in full fluid flow communication when the casings are coupled.

A feature of the invention resides in the provision of automatic latching means for connecting the casings together whenever the pistons are actuated to uncover the ports.

In accordance with this invention a pair of ported casings are provided with mating faces and define, when in mated relation, an elongated piston chamber. A spring-pressed piston is slidably mounted in one casing to seal the port of the casing whenever the spring is expanded. An actuator piston is slidably mounted in the chamber of the other casing and has a pair of spaced heads effective for trapping off flow of fluid from the casing port whenever the casing is in its disconnect position. This actuator piston is partially moved into the other casing when the casings are coupled together to retract the spring-pressed piston out of sealing relation with the ports. Fluid flow between the ports of the coupled-together casings is established between the heads of the actuator piston. Movement of the actuator piston into the casing housing the spring-pressed piston automatically shifts a locking device to secure the two casings in connected relation.

The couplings of this invention permit separation of conduits containing fluid under high pressure without loss of fluid as by squirting action or the like during the uncoupling operation, and without loss of fluid trapped in a casing. The spring-pressed piston in the one casing effectively shears off fluid in that casing at the casing port during the uncoupling operation, while any fluid between the piston heads of the actuator piston is moved back into the other casing during this same uncoupling operation whereupon it becomes sealed in the other casing. The piston heads of the actuator piston, in effect, define a shifting chamber that is, during the uncoupling operation, retracted from partial communication with the casing containing the spring-pressed piston into the other casing, and hydraulic lock will not take place since a constant volume of fluid is displaced during this uncoupling operation.

The couplings of this invention are hydraulically balanced against pressures in the connecting conduits in all positions of operation including the connected positions, the disconnected positions, and during movement to and from these positions.

It is, then, an important object of this invention to provide a self-sealing quick disconnect coupling which will not permit the squirting of fluid under pressure out of the coupling during the coupling and uncoupling operation.

A further object of this invention is to provide a self-sealing coupling which does not permit leakage of fluid trapped in the conduit section of the coupling during the uncoupling operation.

A still further object of the invention is to provide a piston-type quick disconnect coupling which is hydraulically balanced and will not lose fluid during coupling and uncoupling operations.

A still further object of the invention is to provide a piston-type quick disconnect coupling including a pair of ported coupling boxes having mating end faces with one of the boxes slidably supporting a spring pressed port-sealing piston, and with the other box slidably supporting an actuator piston having spaced heads defining a fluid transmission chamber which is partially shifted into the first casing when the casings are connected, and which is retracted wholly within its own casing when the casings are disconnected.

Another object of this invention is to provide a quick disconnect coupling wherein an actuator piston provides a conduit passage for connecting the ports of a pair of casings when the casings are coupled together, and for sealing the ports of one of the casings when the casings are uncoupled.

A still further object of the invention is to provide a piston-type quick disconnect coupling having a pair of coupling boxes each slidably mounting pistons and with the piston in one box actuating the piston in the other box and also shifting a locking device to connect the boxes in fluid flow communication.

Other and further objects of the invention will be apparent to those skilled in the art from the following detailed description of the annexed sheets of drawings which, by way of a preferred example only, illustrate one embodiment of the invention.

On the drawings:

Figure 1 is a top plan view of a piston-type quick disconnect coupling according to this invention showing, in solid lines, the positions of certain parts when the coupling is in connected condition, and showing, in dotted lines, the positions of these parts when the coupling is in disconnected condition.

Figure 2 is an end elevational view of the left-hand end of the coupling of Figure 1.

Figure 3 is a horizontal longitudinal cross-sectional view of the coupling taken along the line III—III of Figure 2.

Figure 4 is a view similar to Figure 3 but illustrating the coupling in disconnect position.

As shown on the drawings:

The coupling 10 of this invention includes a female casing 11 and a male casing 12. As best shown in Figures 3 and 4, the female casing 11 has a cylindrical bore 13 extending longitudinally therethrough with a reduced diameter section 14 adjacent one end thereof and a counterbore 15 extending inwardly from said one end to the reduced section 14. A shoulder or end wall 16 connects the bottom of the counterbore 15 with the reduced bore section 14. A second shoulder 17 connects the other end of the reduced bore section 14 with the bore 13. A groove 18 is provided in the bore 13 at the end of the casing remote from the counterbore 15.

A port opening 19 is provided in the side wall of the casing 11 and opens through the reduced bore section 14. An internally threaded nipple 20 is secured to the casing 11 and has its interior communicating with the port 19.

A piston 21 is slidable in the casing 11 and has the main body portion thereof of a diameter to slidably engage the bore section 14. An increased diameter end flange portion 22 is provided on the piston 21 to slide in the larger bore portion 13. The piston has a reduced end section 23 extending through the counterbore 15 and this reduced end 23 is connected through a shoulder 24 to the diameter of the main body portion of the piston. The piston has a recess 25 extending inwardly from the flanged end thereof to an end wall 26. This end wall 26 has a bore 27 therethrough.

Seals 28 are seated in grooves in the bore section 14 on opposite sides of the port opening 19 to sealingly engage the main body portion of the piston 21. A seal 29 is provided in a groove around the reduced end section 23 of the piston for a purpose to be described.

A coil spring 30 is bottomed at one end in the recess 25 on the end wall 26 of the piston and at the other end on a retainer 31 disposed in the bore 13 and having a flange 31a receiving the end coil of the spring therearound. This retainer 31 is held in the bore 13 by a snap ring 32 seated in the groove 18 and projecting therefrom to provide an abutment for the retainer.

As shown in Figure 4, when the spring 30 is in expanded condition, the piston 21 is in port-covering position and has its flange 22 bottomed on the shoulder 17. In this position the reduced end portion 23 of the piston is in the counterbore 15 and the bottom 16 of the counterbore is aligned with the shoulder 24 of the piston. The end face 26a of the piston end wall 26 is flush with the end face 11a of the casing 11. An annular recess 33 is thereby provided inwardly from the end face 11a of the casing. The main body of the piston 21 covers the port-opening 19 and the seals 28 engaging this main body of the piston will seal the ports.

The male casing 12 has a cylindrical bore 35 extending longitudinally therethrough with a diameter the same as the diameter of the bore section 14 in the female casing 11. A port opening 36 is provided in the casing 12 adjacent the end face 12a of the casing. An internally threaded hollow nipple 37 is secured on the casing to communicate with the port opening 36. A pilot portion 38 of a diameter for fitting in the counterbore 15 projects forwardly from the end face 12a of the casing 12 and has a flat end face 38a for bottoming on the shoulder 16 of the female casing 11 as will hereinafter be more fully described.

A sealing ring 39 is seated in a groove around the pilot portion 38.

An actuator piston designated generally by the reference numeral 40 is slidably mounted in the casing 12 and includes a rod portion 41 in the axial center of the bore 35 with spaced opposed piston heads 42 and 43 thereon slidably engaging the wall of the bore 35. The piston head 42 has a recess 43 in its outer end face. This recess has a diameter for snugly fitting around the reduced diameter end 23 of the piston 21. The skirt of the piston 42 surrounding the recess 43 has an end face 44 for engaging the shoulder 24 of the piston 21.

A sealing ring 45 is seated in a groove in the wall of the bore 35 adjacent the end 12a of the casing 12 to sealingly engage the periphery of the piston when the piston is in disconnect position as shown in Figure 4.

The piston head 43 has an annular groove 43a therearound receiving a sealing ring 46 for sealingly engaging the wall of the bore 35. A sealed-off chamber C is thus provided between the piston heads 42 and 43.

The actuator piston includes a rod portion 41a projecting from the piston head 43 out of the end of the casing 12. A retainer washer 47 receives this rod portion 41a freely therethrough and provides an abutment for the piston head 43 to prevent removal of the actuator piston out of the casing. The washer 47 is retained in the bore 35 of the casing 12 by a snap ring 48 seated in a groove 49 provided in the bore 35.

When the casings 11 and 12 are separated as shown in Figure 4, the piston 21 seals the port 19 and the sealed chamber C closes the port 36. Fluid is thereby sealed in the ends of conduits connected to the nipples 20 and 37.

When the casings 11 and 12 are brought together for the coupling operation, as shown in Figure 3, the pilot portion 38 of the male casing 12 is readily fitted into the counterbore 15 of the female casing 11 and the reduced end 23 of the piston 21 is fitted into the recess 43 of the piston head 42. The end face 38a of the pilot portion 38 is bottomed on the shoulder 16 of the counterbore 15 and the rim end 44 of the piston head 42 is bottomed on the shoulder 24 of the piston 21. The seals 29 and 39 effectively prevent leakage between the mated-together casings 11 and 12.

The actuator piston 40 is then shifted to move the piston head 42 into the bore section 14 of the female casing 11. This movement of the actuator piston causes co-movement of the spring-pressed piston 21 since the piston head 42 engages the piston 21. The spring 30 is thereby compressed and the continued movement of the actuator piston to move its piston head beyond the port 19 opens this port to communication with the chamber C between the piston heads 42 and 43. The chamber C has thus been partially shifted into the casing 11. In this position, however, the piston head 43 is adjacent the port 36 of the casing 12, but does not cover this port, so that the ports 19 and 36 are placed in full fluid flow communication through the sealed shiftable chamber C. The seals 28 and 46 will prevent leakage beyond this chamber, and the seal 39 will prevent leakage between the casings 12 and 13.

When the actuator piston 40 is released the compressed spring 30 will be effective to move the piston 21 back into the port-closing position shown in Figure 4 and fluid in the port 19 will be effectively sheared off by the piston. This same spring movement will move the actuator piston 40 back into the casing 12 and fluid in the chamber C will be retained in the casing 12. The port opening 36 is thereby also effectively sealed since the seals 45 and 46 will prevent leakage out of the chamber C.

The seal 29 which engages the piston head 42 sealingly connects the reduced diameter end section 23 of the piston 21 with the piston head 42 to create hydraulic balance between the two pistons, and to eliminate a possible hydraulic wedge effect which might tend to force the pistons apart as they pass a pressurized port. The small orifice 27 drilled through the end 26 of the piston 21 will bleed out any air or other fluid tending to be trapped in the recess 43 of the piston head 42 when the piston head 42 is seated on the piston end 26. This orifice 27 prevents the possibility of improper bottoming of the two parts due to trapped fluid between the parts.

Movement of the actuator piston to and from its port opening and port closing positions automatically brings about coupling and uncoupling of the casings 11 and 12 as shown in Figures 1 and 2. As therein shown, the top wall of the male casing 12 has an upwardly extending shaft 50 rotatably supporting a latch member 51. This latch member 51 includes a plate portion 52 overlying both casings 11 and 12 and a wrench-engaging head 53 above the plate portion 52. An arcuate groove 54 is formed in the bottom face of the plate portion 52 and extends from a radially extending portion 54a which opens through the edge of the plate to a blind end 54b. A pin 55 extends upwardly from the plate portion 52 in radial spaced relation outward from the blind end 54b of the groove 54. A connecting link 56 overlies the plate 52 and has a curved portion 56a extending around the head 53 so as not to interfere with engagement of the head by a wrench. One end of the link 56 has a slot 57 therein slidably receiving the pin 55 on the plate 52. The other end of the link is connected through a pin 58 with the end of the rod portion 41a of the actuator piston 40.

The female casing 11 has a pin 59 adapted to ride in the cam groove 54 of the plate 52.

When the casings 11 and 12 are in disconnect position, the rod portion 41a of the actuator piston 40 is in the extended position shown by dotted lines in Figure 1, and the plate 52 is in the dotted line position shown in Figure 1. In this position the radial extending portion 54a of the cam groove 54 is adapted to receive the locking pin 59 on the female casing 11 and, when the two casing parts are mated together, the pin 59 will extend through the groove portion 54a into alignment with the main cam groove 54. The head 53 of the rotatable member 51 is then rotated in a clockwise direction as viewed from Figure 1 to move the latch plate 52 for securing the pin 59 in the groove 54 thereof. This initial movement will not cause shifting of the link 56 since the pin 55 carried by the latch plate 52 will move in the slot 57 of the link 56 and the link will not be actuated until the coupling casings 11 and 12 are actually locked together. Further clockwise rotation of the member 51 will thereupon pull the link 56 from the dotted line position shown in Figure 1 to the solid line position thereby pulling the rod portion 41a of the actuator piston 40 to move the piston heads 42 and 43 from the position shown in Figure 4 to the position shown in Figure 3.

It will be noted that latching together of the casings 11 and 12 occurs before the actuator piston 40 is shifted to move chamber C into the casing 11, and that unlatching of the casings does not occur until the chamber C is completely retracted into the casing 12. Therefore, the casings are latched together in sealed relation at all times when the chamber C is in communication with casing 11, and leakage of fluid in the coupling cannot occur even during the uncoupling operation.

From the above descriptions, it will be understood that this invention provides a quick disconnect coupling wherein pistons selectively connect coupling casings in full fluid flow communication, and wherein these pistons seal the casings whenever the casings are uncoupled. The pistons are arranged so that no fluid can be lost from the casings at any time even during the coupling and uncoupling operations, and so that any fluid which is trapped in the casings must remain therein until the next coupling operation. The pistons are readily actuated because they are hydraulically balanced, and shifting of the actuator piston automatically results in a securing together of the coupling casings.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A self-sealing quick disconnect coupling comprising a pair of casings having mating faces and aligned bores, said casings having ports communicating with said bores, a spring-pressed piston slidably mounted in one casing and adapted to cover the port of said one casing, an actuator piston slidably mounted for movement in the bores of both casings, said actuator piston having opposed piston heads defining a flow chamber therebetween in said bores, means for sliding said actuator piston to move the flow chamber from a position completely within one casing for closing the port of said casing to a position partly in both casings for joining the ports of both casings in fluid flow communication through said chamber, said actuator piston having means engaging said spring-pressed piston to move the spring-pressed piston out of sealing relation with the port of said one casing whenever the flow chamber provided by said actuator piston is moved into said one casing, and means actuated by shifting movement of the actuator piston for securing the casings together in coupled relation whenever the flow chamber is partially disposed in both casings and for permitting separation of the casings whenever the flow chamber is disposed completely in one casing 2. A self-sealing quick disconnect coupling comprising a first ported casing having a spring-pressed piston slidably mounted therein between port-covering and uncovering positions, a second ported casing adapted to mate with said first casing having an actuator piston slidable therein and equipped with opposed piston heads defining a sealed flow chamber therebetween for closing the port of the second casing whenever said chamber is disposed completely in the second casing, means for shifting said actuator piston against the spring-pressed piston in the first casing to move the spring-pressed piston to port-uncovering position and to shift the flow chamber into communication with both casings for joining the ports thereof in fluid flow relation, and means actuated by the shifting of said actuator piston to connect the casings together whenever the actuator piston is shifted to move its flow chamber partly into the first casing and to permit separation of the casings whenever the actuator piston is shifted to move its flow chamber wholly within said second casing.

3. A self-sealing quick disconnect coupling comprising a first ported casing, a piston slidably mounted in said first casing between port-covering and uncovering positions, means urging said piston to port-covering position, a second ported casing adapted to mate with said first casing, a piston slidably mounted in said second casing having a head closing the casing to seal fluid in the casing, means actuating the piston in said second casing to move said head into the first casing beyond the port of said first casing for shifting the piston in the first casing to port-uncovering position, and means actuated by the piston in said second casing for connecting the first and second casings in coupled relation whenever said piston head is moved into the first casing.

4. A piston type quick disconnect coupling comprising first and second mating ported casings defining aligned piston chambers, a separate piston in each casing arranged to close the ports thereof, the piston of the first casing being movable into the second casing beyond the port of the second casing to shift the piston in said second casing to port-opening position and to join the ports of both casings, latch means on said first casing, latch keeper means on said second casing, a link joining the latch means with the piston in the first casing, and means for shifting the latch means to first engage the keeper for coupling the casings and to then shift the piston linked thereto into the second casing.

5. A piston type self-sealing quick disconnect coupling comprising a female casing having a longitudinally extending bore and a port in the side wall of said bore together with a recess surrounding an end of the bore in one face of the casing, a spring-pressed piston slidable in the bore of said female casing and urged by said spring into port-covering position, a male casing having a longitudinally extending bore and a pilot portion for seating in the recess in the end face of said female casing, a seal between the seated pilot portion and the recess, said pilot portion and said recess aligning the bores of said male and female casings, an actuator piston slidably mounted in said bores and having a first head for engaging the spring-pressed piston in the female casing and a second head longitudinally spaced from said first head to cooperate therewith in defining a flow chamber connecting the ports of the casings whenever the actuator piston moves the spring-pressed piston out of port-covering position and to close the port of the male casing whenever both heads of the actuator piston are disposed in the male opening.

6. In a quick disconnect coupling, a pair of casings having mating end faces, a latch member rotatably mounted on one of said casings, a latch pin secured on the other of said casings, said latch member having a cam recess releasably receiving said pin to connect the casings in coupled relation and to permit separation of the casings in uncoupled relation, valve members in each casing controlling flow therethrough, and a link connecting one of said valve members to said rotatable latch for shifting the valve member whenever the latch is rotated.

7. A self-sealing quick disconnect coupling comprising a first ported casing having a slidable piston therein, a second ported casing having a slidable piston therein, said pistons having opposing faces brought into engagement whenever the casings are positioned together for a coupling operation, a rotatable latch member on one of said casings, a latch pin on the other of said casings, a link connecting the latch member with the piston in said one casing, and means for rotating the latch member to simultaneously couple the casings and shift the pistons therein to port-uncovering position for connecting the ports thereof in fluid flow communication.

8. In a quick disconnect coupling, a first ported casing having a piston bore, a second ported casing having a piston bore adapted to be aligned with the bore of the first casing whenever the casings are positioned for coupling, a piston carried by the second casing having a head slidable in the bores of both casings and adapted to be moved beyond the port of the second casing to join the ports of both casings in fluid flow communication, said piston head when retracted into said second casing being effective to trap fluid in the second casing and prevent leakage from the port of said second casing.

9. A coupling comprising a pair of ported casings having mating portions adapted to be connected in sealed relation, a piston in each casing arranged to seal the port of the casing, means for shifting the piston in one casing into the other casing against the piston in said other casing for moving both pistons to port-uncovering positions for connecting the ports of both casings, and latch mechanism actuated by said means to couple the casings together in sealed relation before the casing ports are uncovered.

10. A coupling comprising mating separable ported casings, a spring-pressed piston in one casing spring urged to port closing position, an actuator piston in the other casing having a recessed port closing head adapted for receiving and acting on a portion of the spring-pressed piston, a seal between said recessed head and said portion of the spring-pressed piston, means for shifting the actuator piston to first move its recessed head onto and against said portion of the spring-pressed piston and to then move both pistons beyond port-closing positions to connect the ports of both casings whereby said seal will prevent hydraulic wedge separation of the pistons as they pass a pressurized port.

11. A piston type self-sealing coupling comprising first and second mating separable ported casings, port closing pistons in said casings having nesting portions, a seal for the nesting portions of the pistons, means for shifting the piston in the first casing first into nested sealed engaging relation with the piston in the second casing and then into the second casing beyond the port thereof for uncovering said port and for joining the ports of both casings, and said nested sealed relation of the pistons being effective to eliminate separation of the pistons as they pass the port of the second casing even when said port is highly pressurized.

DONALD R. SPOTZ.

REFERENCES CITED

The following references are of record in the file of this patent:

UNITED STATES PATENTS

| Number | Name | Date |
| --- | --- | --- |
| 1,968,421 | Proctor | July 31, 1934 |
| 2,120,667 | Oliver | June 14, 1938 |
| 2,203,922 | Paisley | June 11, 1940 |
| 2,342,763 | Smith | Feb. 29, 1944 |
| 2,393,679 | Gunderson | Jan. 29, 1946 |